(12) United States Patent
Houille et al.

(10) Patent No.: US 11,506,168 B2
(45) Date of Patent: Nov. 22, 2022

(54) GASOLINE INTERNAL COMBUSTION ENGINE WITH ASSISTED COMPRESSION IGNITION

(71) Applicant: ARAMCO OVERSEAS COMPANY B.V., The Hague (NL)

(72) Inventors: Sebastien Houille, Paris (FR); Virginie Morel, Suresnes (FR); Sankesh Durgada, Rueil-Malmaison (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/363,397

(22) Filed: Jun. 30, 2021

(65) Prior Publication Data
US 2022/0003148 A1    Jan. 6, 2022

(30) Foreign Application Priority Data

Jul. 1, 2020 (FR) ....................... 2006928

(51) Int. Cl.
| | |
|---|---|
| *F02P 15/08* | (2006.01) |
| *F02B 19/14* | (2006.01) |
| *F02D 41/40* | (2006.01) |
| *F02F 1/24* | (2006.01) |
| *F02B 19/10* | (2006.01) |
| *F02B 19/12* | (2006.01) |
| *F02B 31/00* | (2006.01) |
| *F02P 5/15* | (2006.01) |
| *F02P 15/00* | (2006.01) |
| *F02P 15/12* | (2006.01) |

(52) U.S. Cl.
CPC ............. *F02P 15/08* (2013.01); *F02B 19/10* (2013.01); *F02B 19/12* (2013.01); *F02B 19/14* (2013.01); *F02B 31/00* (2013.01); *F02D 41/402* (2013.01); *F02F 1/242* (2013.01); *F02P 5/15* (2013.01); *F02P 15/008* (2013.01); *F02P 15/12* (2013.01)

(58) Field of Classification Search
CPC .......... F02P 15/08; F02P 15/008; F02P 15/12; F02B 19/10; F02B 19/12; F02B 19/14; F02B 31/00; F02D 41/402; F02F 1/242
USPC .................................................. 123/260, 640
See application file for complete search history.

(56) References Cited

U.S. PATENT DOCUMENTS

| | | | | |
|---|---|---|---|---|
| 1,988,754 A | * | 1/1935 | Sleffel ...................... | F02B 1/00 |
| | | | | 123/260 |
| 4,046,111 A | * | 9/1977 | Nagano ................... | F02B 19/12 |
| | | | | 123/263 |

(Continued)

*Primary Examiner* — Mahmoud Gimie
(74) *Attorney, Agent, or Firm* — Osha Bergman Watanabe & Burton LLP

(57) ABSTRACT

An internal combustion engine includes a combustion chamber with a cylinder head, a cylinder, and a piston. The internal combustion engine also includes at least one intake valve and at least one exhaust valve that are connected to the combustion chamber, a fuel injector that injects fuel into the combustion chamber, at least two ignition devices arranged in the combustion chamber, and control means that control the valves, the injector, and the ignition means. The control means operate the engine according to different combustion modes including a controlled ignition combustion mode, a compression ignition combustion mode, and an assisted compression ignition combustion mode. The control means activate the ignition means in the assisted compression ignition combustion mode.

10 Claims, 2 Drawing Sheets

(56) References Cited

U.S. PATENT DOCUMENTS

| | | | | |
|---|---|---|---|---|
| 4,144,860 A | * | 3/1979 | Muranaka | F02P 15/02 |
| | | | | 123/406.52 |
| 4,177,783 A | * | 12/1979 | Palomeque | F02P 15/02 |
| | | | | 123/638 |
| 5,327,864 A | * | 7/1994 | Regueiro | F02B 17/005 |
| | | | | 123/260 |
| 5,692,468 A | * | 12/1997 | Haman | F02B 23/101 |
| | | | | 123/259 |
| 7,168,420 B1 | * | 1/2007 | Yang | F02D 41/003 |
| | | | | 123/295 |
| 2007/0062486 A1 | * | 3/2007 | Yang | F02D 41/2451 |
| | | | | 123/295 |
| 2011/0180035 A1 | * | 7/2011 | Durrett | F02D 41/3041 |
| | | | | 123/305 |
| 2019/0078498 A1 | * | 3/2019 | Bedogni | F02B 19/1023 |

* cited by examiner

[Fig 2]

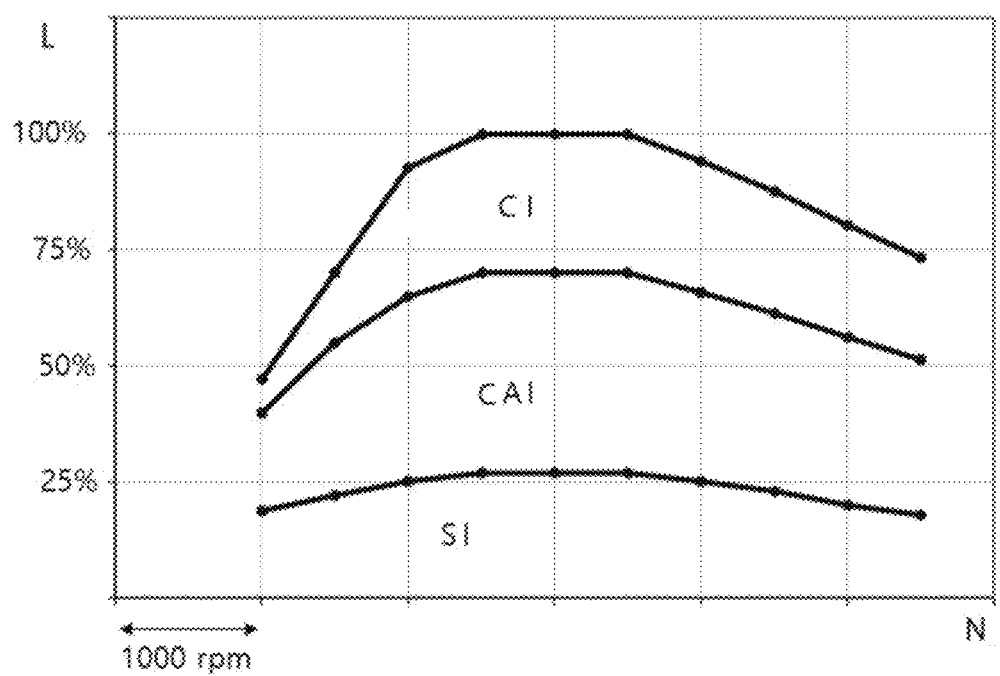
[Fig 3]
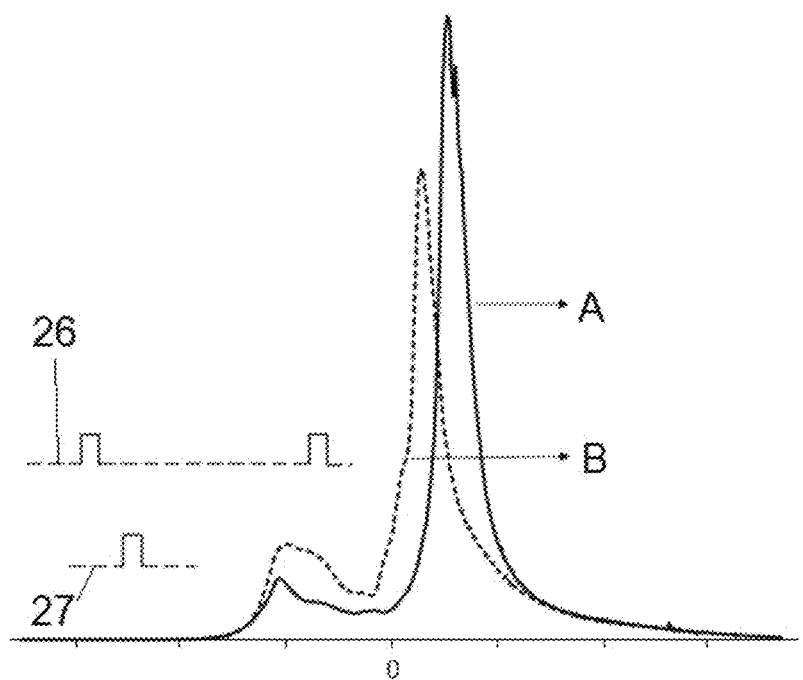
[Fig 4]

GASOLINE INTERNAL COMBUSTION ENGINE WITH ASSISTED COMPRESSION IGNITION

FIELD OF THE INVENTION

The present invention relates to the technical field of internal combustion engines. More particularly, the invention relates to an internal combustion engine with assisted compression ignition.

BACKGROUND

Today, two major architectures dominate automotive engines, differing by their fuel: gasoline and diesel. They also differ by their combustion mode: spark ignition combustion for the gasoline and autoignition of the air-fuel mixture for the diesel fuel.

The image of diesel engines is that of an architecture that can travel many kilometers while operating at a low total cost. In addition, diesel engines offer the advantage of very high low-speed torque compared to gasoline which, on heavy vehicles of the utility vehicle type or equivalent, allows the vehicle to take off with adequate performance (unlike gasoline engines).

However, diesel combustion has pollutant emission characteristics which require more complex exhaust gas aftertreatment systems than for gasoline engines. In addition, for various reasons, the legislation tends to want to exclude diesel engines from city centers. Finally, diesel fuel is mainly distributed within European countries but it is by no means a global fuel like gasoline.

For these reasons, there is a need to provide a high efficiency gasoline engine, making it possible to achieve a good compromise between the total operating cost and the CO2 emissions, with a performance, in torque at low speed essentially, close to that of diesel engines.

Thus, to get closer to a diesel type combustion with an engine running on gasoline, it is known, for example from document US2019/0145338A1, to have a two-phase combustion mode: autoignition of a premixed part of the fuel followed by combustion by diffusion of the rest of the injected fuel.

The main difficulty with this break in combustion lies in the characteristics of the autoignition delay of the gasoline fuel. Gasoline is commonly known to resist autoignition and prevent knocking on gasoline engines. To allow gasoline to autoignite, the pressure and temperature conditions in the combustion chamber must be optimal. In addition, it is more difficult to autoignite gasoline compared to diesel which is an obstacle when addressing low loads and high speeds.

One of the solutions studied to overcome this difficulty, known from document US2019/0145338A1, is to use a spark plug to prepare a small area of the combustion chamber around the spark point of the spark plug. Thus, a flame core is initiated by the spark from the spark plug which propagates in the air/fuel mixture and when the temperature and pressure conditions in the combustion chamber have increased sufficiently to reach the autoignition threshold, the rest of the air/fuel mixture spontaneously autoignites. Here, we will distinguish the use of the spark plug only to prepare a zone of the combustion chamber and not as an initiator of a combustion which then propagates by flame front, which, in the latter case, is the classic combustion mode of spark-ignition gasoline engines. This document presents various injection strategies associated with combustion modes depending on engine coolant temperature and air temperature. However, these strategies still have shortcomings at low loads when the engine is considered cold and at high speeds, combustion by ignition and flame front propagation being chosen.

Thus, the invention aims to improve the difficulties encountered in the prior art with this specific type of combustion.

SUMMARY

To achieve this objective, there is provided according to the invention an internal combustion engine comprising:
- a cylinder head, a cylinder, and a piston defining a combustion chamber,
- at least one air intake valve and one flue gas exhaust valve in the combustion chamber,
- a fuel injector for direct injection into the combustion chamber,
- means for igniting combustion,
- control means arranged to control the valves, the injector and the ignition means and operate the engine according to different combustion modes including a combustion mode by controlled ignition, a combustion mode by compression ignition and a combustion mode by assisted compression ignition, characterized in that the ignition means are composed of at least two ignition devices arranged in the combustion chamber, the control means being arranged to activate the ignition means in the combustion mode by assisted compression ignition.

The technical effect is to initiate two flame cores, at separate positions in the combustion chamber, which makes it easier to trigger the autoignition process, where it is not possible to do so with a single flame core from a single ignition device.

Various additional features may be provided, alone or in combination:

According to one embodiment, at least one of the ignition devices is a spark ignition plug or a glow plug.

According to one embodiment, the engine comprises a prechamber housing one of the ignition devices.

According to one embodiment, at least one of the ignition devices is located radially with respect to the axis of the cylinder between 5% and 40% of the cylinder bore diameter.

According to one embodiment, the engine is able to produce a vortex movement perpendicular to the axis of the so-called "swirl" cylinder, the location of at least one of the ignition devices being in a region which, from of a fuel jet and in the direction of the vortex, covers half of the angle between two consecutive fuel jets produced by the injector, the angle being measured perpendicular to the axis of the cylinder.

According to one embodiment, the difference between the triggering of the first ignition device and the last ignition device is not more than 30 degrees of crankshaft angle.

According to one embodiment, the control means are arranged to activate the ignition devices during the combustion mode by assisted compression ignition in order to control the desired phasing and distribution of heat release between a flame propagation phase and a combustion phase by compression ignition.

According to one embodiment, the control means are arranged to activate the ignition devices during the transition between the different combustion modes in order to control the desired phasing and distribution of heat release between a flame propagation phase and a combustion by compression ignition.

According to one embodiment, the control means are arranged to activate the two ignition means between a first fuel injection intended to form a premix in the combustion chamber and a second fuel injection intended to burn by compression ignition.

According to one embodiment, the control means are arranged to activate several injections of fuel intended to burn by compression ignition in order to control the desired phasing and distribution of heat release between a flame propagation phase and a combustion phase by compression ignition.

BRIEF DESCRIPTION OF THE DRAWINGS

Other features and advantages will become apparent upon reading the following description of a particular non-limiting embodiment of the invention, made with reference to the figures in which:

FIG. 2 shows an embodiment of the invention seen from the bottom of the engine cylinder head.

FIG. 3 represents an example of an engine operating map according to distinct combustion modes, based on the engine speed and load.

FIG. 4 shows the combustion heat release in the combustion chamber in an example of combustion by assisted compression ignition.

DETAILED DESCRIPTION

Figure 1:
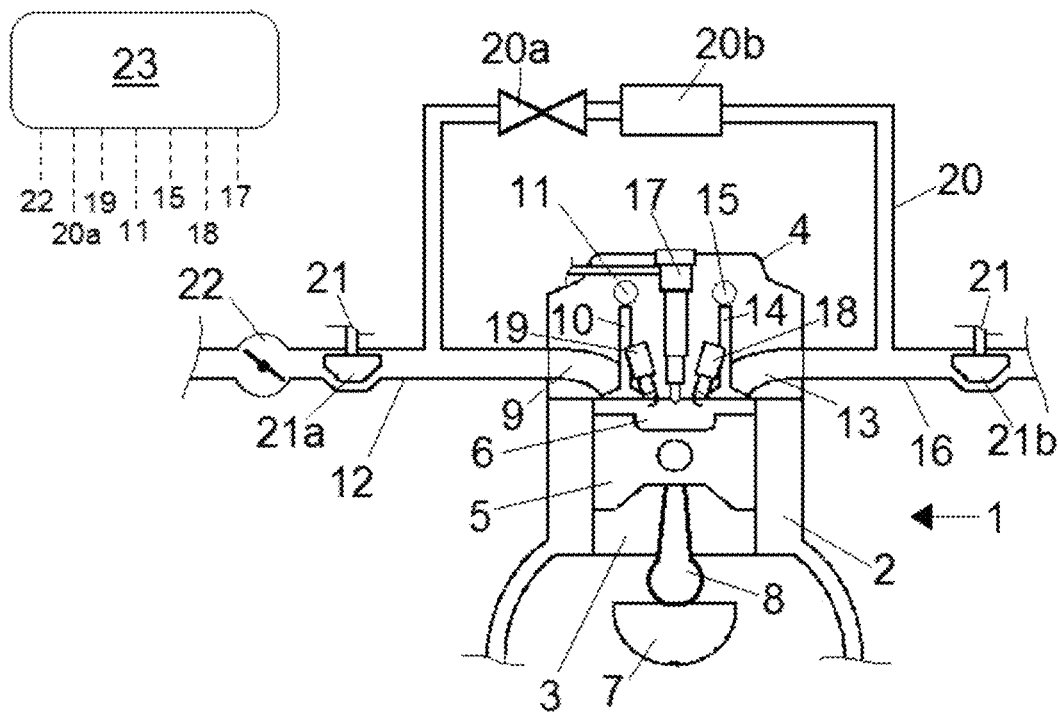
FIG. 1 shows schematically an internal combustion engine of the invention.
Figure 1:
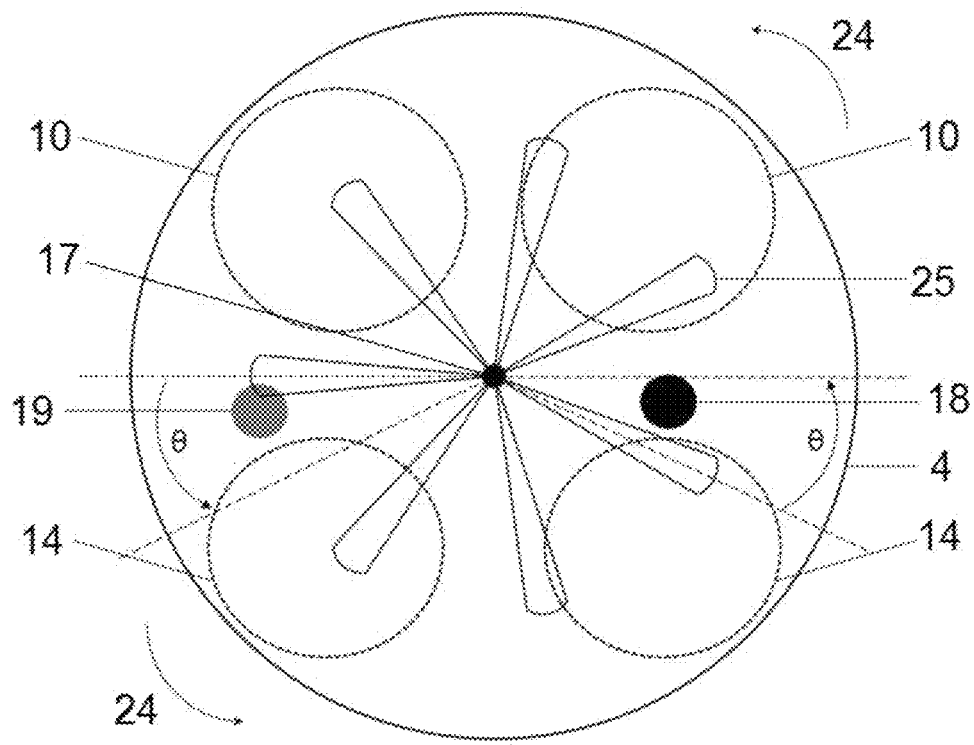

FIG. 1 shows a four-stroke internal combustion engine 1 whose engine cycle is conventionally broken down into four phases: an intake phase, a compression phase, a combustion-expansion phase and an exhaust phase. This engine 1 can be fitted to a motor vehicle to provide the power required for its motion.

The engine 1 comprises a cylinder block 2 comprising several cylinders 3 (only one cylinder is shown in FIG. 1), closed at the top by a cylinder head 4. Inside this cylinder 3 is housed a piston 5 which makes it possible to define a combustion chamber 6 with the cylinder 3 and the cylinder head 4. The piston 5 is mounted to move in translation between a top dead center (TDC) and a bottom dead center (BDC).

The piston 5 is connected to a crankshaft 7 by means of a connecting rod 8, so that the reciprocating sliding of the piston 5 in the cylinder 3 allows the rotation of the crankshaft 7.

The cylinder head 4 comprises an intake manifold 9 opening into the combustion chamber 6 through an intake opening. This intake exhaust opening can be closed by an intake valve 10 movable between a closed position and an open position in which the intake air enters inside the combustion chamber 6. This intake valve 10 is moved between these open and closed positions by actuating means 11. The opening and closing of the intake valve 10 take place at determined times during the engine cycle.

The intake manifold 9 is connected to an air intake line 12 through which the air admitted into the engine 1 arrives.

The cylinder head 4 also comprises an exhaust manifold 13 also opening into the combustion chamber 6 through an exhaust opening. This exhaust opening can be closed by an exhaust valve 14 movable between a closed position and an open position in which the flue gases contained inside the combustion chamber 6 can escape. This exhaust valve 14 is moved between these open and closed positions by actuating means 15. The opening and closing of the exhaust valves 14 take place at determined times during the engine cycle.

The exhaust manifold 13 is connected to an exhaust line 16 through which the flue gases produced by the engine 1 are evacuated.

The engine 1 may further include a flue gas recirculation line 20 extending between the exhaust line 16 and the air intake line 12. This line is conventionally equipped with a valve 20a for controlling the flue gas flow to be returned to the air intake line 3 and a cooler 20b for these flue gases.

The engine 1 may also include a turbocharger 21 whose compressor wheel 21a is arranged in the intake line 12 and the turbine 21b is arranged in the exhaust line 16.

The engine 1 also includes a valve 22 for metering air admitted into the engine 1.

The engine also comprises a fuel injector 17, arranged in the cylinder head 4 and designed to inject fuel directly inside the combustion chamber 6. According to this embodiment, the engine 1 is a gasoline fuel engine, gasoline being used as fuel injected by the injector 17. However, this fuel called gasoline fuel is not necessarily entirely gasoline, and may contain a subcomponent such as alcohol. This injector 17 is a so-called high-pressure injector, in that the fuel is injected into the combustion chamber 6 at an injection pressure of between 200 and 2,500 bars, which allows good atomization of the fuel and reduces its evaporation time. The injection pressure may be variable and adjusted to the operating conditions of the engine by means of a pump (not shown).

The geometric compression ratio of engine 1 is between 15 and 20, which makes it possible to achieve the pressure and temperature conditions required for autoignition by compression of the air/fuel mixture.

In this embodiment, ignition means are provided for each cylinder 3. These ignition means comprise a first ignition device 18 arranged in the combustion chamber. This first ignition device 18 may be a spark plug which supplies an amount of energy to the air fuel mixture in the form of a spark. The function of this spark is to assist the compression ignition of the fuel load, if necessary. The triggering of the spark is controlled at specific times during the engine cycle.

According to the invention, the ignition means further comprise, for each cylinder 3, a second ignition device 19 arranged in the combustion chamber, separate from the first ignition device 18. This second ignition device 19 may also be a spark plug which supplies an amount of energy to the air fuel mixture in the form of a spark. The triggering of the spark is controlled at specific times during the engine cycle.

FIG. 2 shows an embodiment of the invention seen from the bottom of the cylinder head 4 of the engine 1.

In this embodiment, the engine 1 comprises, for each cylinder, two air intake valves and two exhaust valves for the flue gases in the combustion chamber. The fuel injector 17 is mounted on the cylinder head in the axis of the cylinder. This injector 17 is shown in FIG. 2 as being capable of producing seven fuel jets 25. Each jet 25 is separated at an angle of 2θ, seen in a plane orthogonal to the axis of the cylinder. This number of jets is not limiting; other injectors can be provided with more or less fuel jets.

FIG. 2 shows a direction 24 of circular aerodynamic vortex movement rotating around the central axis of the cylinder, also called "swirl".

As illustrated in FIG. 2, each of the locations of the two spark plugs 18, 19 is in a region which, from a fuel jet and in the vortex direction 24, covers half of the angle θ between two consecutive fuel jets produced by the injector 17, the angle being measured along a plane orthogonal to the axis of the cylinder 3. In the radial direction with respect to the axis of the cylinder, the spark plugs 18, 19 are between 5% and 40% of the cylinder bore diameter.

As mentioned above, the ignition devices are spark plugs in that embodiment. However, other type of ignition devices may be provided for at least one of the ignition devices, such as a glow plug or corona igniter.

In an embodiment not shown, the combustion chamber 6 may also include a prechamber housing one of the ignition devices. The prechamber may also house the fuel injector.

The various components of the engine 1 which may be controlled, such as the valves 10, 14 via the actuators 11, 15, the ignition means 18 and 19, the fuel injector 17, the air metering valve 22 and, where appropriate, the flue gas flow control valve 20a, are controlled by means 23 for controlling the operation of the engine. This control means 23 may be an electronic computer.

The control means 23 are also provided to make it possible to operate the engine 1 according to several combustion modes and to choose the combustion mode to be adopted based on operating parameters of the engine such as its speed and its load.

FIG. 3 shows an example of the application of the different combustion modes adopted depending on the speed, N, and engine load, L. These different combustion modes are:
 a combustion mode by controlled ignition, SI: in this combustion mode, combustion is initiated by the spark plug. This combustion mode corresponds to the controlled ignition and flame propagation combustion mode generally adopted in spark ignition engines. In this combustion mode, the fuel load is mixed with air prior to ignition.
 a combustion mode by compression ignition, CI: in this combustion mode the combustion takes place by compression without the assistance of an external ignition. The temperature and pressure conditions are conducive to the autoignition of the fuel mixture.
 a combustion mode by assisted compression ignition, ACI: this combustion mode is a combination of the two previous combustion modes, SI and CI. In this combustion mode, a portion of the fuel load is premixed then ignited by at least one ignition device, while the remainder of the fuel load is then burned by compression ignition.

Thus, this ACI combustion mode is a hybrid mode of combustion where both flame propagation and compression ignition occur sequentially.

An example of the sequence of events is explained in more detail with reference to FIG. 4.

FIG. 4 is a graph showing the rate of combustion heat release inside the combustion chamber of a conventional internal combustion engine in a fully hot condition including a cylinder head depicted in FIG. 2. In this example, the engine speed is 1500 rpm and the engine power corresponds to an average load. The x-axis represents the engine cycle and the value 0, the combustion top dead center.

A fully hot engine condition is understood to mean an engine for which the engine coolant temperature is equal to 90° C. or higher. The engine condition will be qualified as partially hot for a coolant temperature between 30° C. and 90° C. The engine condition will be qualified as cold if the engine coolant temperature is below 30° C.

The trigger signals to activate the fuel injection and the ignition are also displayed respectively by the references 26 and 27. In this example, two injection events are performed, one before the ignition is triggered and the other after the ignition is triggered.

The graph of case A corresponds to the case where only the spark plug 18 is activated and the spark plug 19 is not activated. The graph of case B corresponds to the case where the two spark plugs 18 and 19 are activated simultaneously by the ignition trigger signal 27.

The sequence of events leading to combustion for case A with reference to FIG. 4 is as follows:

The first injection of the injector 17 takes place during the compression stroke of the engine when the piston is close to TDC (top dead center). This first injection is intended to form a premix in the combustion chamber 6. The spark plug 18 is activated, which triggers the combustion of the fuel injected from the very first injection in spark ignition mode. This results in a significant increase in the pressure and temperature inside the combustion chamber due to combustion.

After a few degrees of crankshaft angle of the engine, a second fuel injection takes place, as shown in FIG. 4. During this second injection, combustion of the fuel from the first injection is still in progress. Due to the high temperature of the mixture inside the combustion chamber, the fuel entering during this second injection begins to ignite rapidly in the compression ignition combustion mode. The unburned fuel from the first injection and any partially burned fuel from the flame propagation combustion mode are now rapidly burned in the compression ignition combustion mode. After the completion of both fuel injections, any remaining unburned or partially burned fuel is burned in the compression ignition mode.

It can be seen from FIG. 4 that, in case A where only one ignition device 18 is activated, the rate of heat release is comparatively higher than in case B where both ignition devices 18 and 19 are activated. The second ignition device 19 creates an additional flame which increases the combustion rate in the flame propagation combustion mode before the start of the second injection, thereby controlling the total amount of injected fuel that burns in the flame propagation mode and in the compression ignition mode. It can be seen in FIG. 4 that the heat release under the first peak corresponds to combustion in flame propagation mode and the heat release under the second upper peak corresponds to combustion in compression ignition mode. In this example, case B has a higher heat release in flame propagation mode and a lower heat release in compression ignition mode compared to case A. The control means 23 are arranged to activate the ignition devices 18, 19 during the combustion mode by assisted compression ignition (ACI) for controlling the phasing, in other words, the desired timing during the engine cycle, and distribution of heat release between a flame propagation phase and a combustion phase by compression ignition.

This technique of using a secondary ignition device for controlling the heat release in controlled ignition or flame propagation combustion mode, and in compression ignition combustion mode, is advantageous in that it optimizes combustion performance.

The timing of the triggering of the second ignition device 19 with respect to the timing of the triggering of the first ignition device 18 may be optimized for different operating conditions depending on the speed, engine load and engine condition. By optimizing the triggering times of the injection and ignition devices, the distribution of heat release between the flame propagation phase and the autoignition combustion phase may be modified and easily controlled, which makes it possible to improve combustion performance and control. The maximum difference between the triggering of the first ignition device and the last ignition device, here the second ignition device 19, is preferably not more than 30 degrees of crankshaft angle. The use of at least two ignition devices as described is advantageous to achieve the desired combustion mode, in particular when the engine is in a cold or partially hot condition, and during the transition between the different combustion modes, in order to control the phasing, in other words, the timing in the engine cycle, and the desired distribution of heat release between a flame propagation phase and a combustion phase by compression ignition. This results in improved efficiency, reduced emissions and better combustion stability.

The invention is not limited to the above embodiment. As a variant, the second fuel injection may be replaced by several fuel injections intended to burn by autoignition in order to control the phasing, in other words, the timing in the engine cycle, and the desired distribution of heat release between a flame propagation phase and a combustion phase by compression ignition.

The invention is not limited to the illustration in FIG. 2. The orientation and the number of ignition devices are not restrictive. The number of injector holes is also not restrictive. The activation sequences of the ignition devices with respect to the injection times are not restrictive. The ignition systems may be activated or deactivated depending on certain engine operating conditions.

For economic reasons, this engine 1 may be an internal combustion engine with compression ignition initially intended to run on diesel. This engine, initially intended to run on diesel, conventionally includes a housing for a glow plug and, in order to maximize the investment, it is provided to use this glow plug housing to install one of the two ignition devices 18, 19.

Nevertheless, a more optimal location for combustion, and therefore different from the position of the glow plug, may also be envisaged. However, this option is less economical because additional manufacturing operations are to be expected: sealing of the glow plug housing, fitting of a spark plug housing in the cylinder head.

By using an additional second ignition device, the invention makes it possible to increase the flexibility in combustion control and, therefore, this leads to improved optimization of engine performance. The use of the combustion mode by assisted compression ignition can be applied over broader engine speed/load/temperature ranges than the prior art.

Therefore, the invention improves the operation of such combustion mode by assisted compression ignition, thereby improving thermal efficiency, reducing emissions and achieving better combustion control.

The invention claimed is:

1. An internal combustion engine comprising:
   a combustion chamber, the combustion chamber comprising:
   a cylinder head,
   a cylinder, and
   a piston,
   at least one air intake valve and one exhaust valve connected to the combustion chamber,
   a fuel injector configured to inject fuel into the combustion chamber,
   at least two ignition devices arranged in the combustion chamber, and
   control means configured to control the valves, the injector, and the ignition means,
   wherein the control means operate the engine according to different combustion modes including: a controlled ignition combustion mode, a compression ignition combustion mode, and an assisted compression ignition combustion mode,
   wherein the control means are configured to activate the at least two ignition devices in the assisted compression ignition combustion mode, and
   wherein the control means activate the at least two ignition devices during a transition between the different combustion modes.

2. The engine according to claim 1, wherein at least one of the ignition devices is a spark plug or a glow plug.

3. The engine according to claim 1, wherein the engine comprises a prechamber that houses one of the ignition devices.

4. The engine according to claim 1, wherein at least one of the ignition devices is located between 5% and 40% of a bore diameter of the cylinder in a radial direction with respect to an axis of the cylinder.

5. The engine according to claim 1,
   wherein the engine is configured to produce a vortex movement perpendicular to an axis of the cylinder, and
   wherein a location of at least one of the ignition devices is in an area which, from a fuel jet and in a direction of the vortex movement, covers half of an angle between two consecutive fuel jets produced by the injector, and
   wherein the angle is measured perpendicular to the axis of the cylinder.

6. The engine according to claim 1, wherein a difference between a triggering of the at least two ignition devices is not more than 30 degrees of a crankshaft angle.

7. The engine according to claim 1, wherein the control means are configured to activate the ignition devices during the assisted compression ignition combustion mode to control a desired phasing and a distribution of heat release between a flame propagation phase and a compression ignition combustion phase.

8. The engine according to claim 1, wherein the activation of the ignition devices during the transition between the different combustion modes controls a desired phasing and a distribution of heat release between a flame propagation phase and a compression ignition combustion phase.

9. The engine according to claim 1, wherein the control means are configured to activate the two ignition means between a first fuel injection that forms a premix in the combustion chamber and a second fuel injection that burn by compression ignition.

10. The engine according to claim 1, wherein the control means are configured to activate several fuel injections that burn by compression ignition to control a desired phasing and a distribution of heat release between a flame propagation phase and a compression ignition combustion phase.

* * * * *